United States Patent [19]

Nikaido et al.

[11] 3,962,061

[45] June 8, 1976

[54] PROCESS FOR COATING ALUMINUM OR ALUMINUM ALLOY

[75] Inventors: Norio Nikaido; Shinji Shirai; Mototaka Iihashi; Sueo Umemoto, all of Hiratsuka, Japan

[73] Assignees: Kansai Paint Company, Ltd.; Fuji Sashi Industries Limited, both of Japan

[22] Filed: Nov. 11, 1974

[21] Appl. No.: 522,878

[30] Foreign Application Priority Data

Nov. 20, 1973 Japan.............................. 48-131096

[52] U.S. Cl. .................................................. 204/181
[51] Int. Cl.² .................. C25D 13/06; C25D 13/10; C25D 13/20
[58] Field of Search ..................................... 204/181

[56] References Cited
UNITED STATES PATENTS

| | | | |
|---|---|---|---|
| 2,868,702 | 1/1959 | Brennan | 204/28 |
| 3,290,235 | 12/1966 | Gilchrist | 204/181 |
| 3,622,473 | 11/1971 | Ohta et al. | 204/181 |
| 3,812,023 | 5/1974 | Schardein et al. | 204/58 |

FOREIGN PATENTS OR APPLICATIONS

| | | | |
|---|---|---|---|
| 2,160,428 | 6/1973 | France | 204/181 |

Primary Examiner—Howard S. Williams
Attorney, Agent, or Firm—Larson, Taylor and Hinds

[57] ABSTRACT

A process for coating an aluminum or aluminum alloy comprising the steps of subjecting aluminum or aluminum alloy to boehmite treatment or chemical conversion treatment, conducting electrolysis using the resulting aluminum or aluminum alloy as an electrode in an aqueous solution of a water-soluble salt of at least one oxyacid, and thereafter coating electrophoretically the aluminum or aluminum alloy with an aqueous organic coating composition containing a binder resin and a water-soluble salt of at least one oxyacid to form a resin layer, said oxyacid contained in the aqueous solution and aqueous organic coating composition being at least one oxyacid selected from the group consisting of silicic acid, boric acid, phosphoric acid, molybdic acid, vanadic acid, permanganic acid, stannic acid and tungstic acid.

25 Claims, No Drawings

PROCESS FOR COATING ALUMINUM OR ALUMINUM ALLOY

This invention relates to a process for coating aluminum or aluminum alloy, more particularly to a process for coating with an organic composition aluminum or aluminum alloy which has been subjected to boehmite treatment of chemical conversion treatment.

It is impossible to coat aluminum or aluminum alloy directly with an organic coating composition due to its poor ability to adhere to the organic coating composition. Various improved processes have heretofore been proposed, therefore. According to one of the proposed processes, aluminum or aluminum alloy is subjected to so-called boehmite treatment by contacting the same with hot water or steam containing or not containing ammonia or amines to form an aluminum oxide layer of its surface which layer is predominantly composed of $Al_2O_3 \cdot nH_2O$ wherein n is usually an integer of 1 to 3 and the aluminum or aluminum alloy is thereafter coated with an organic coating composition. Although aluminum or aluminum alloy can be coated with the organic coating composition by this process, the adhesion between the organic coating and the aluminum oxide layer formed is still poor. Furthermore, the aluminum oxide layer produced by the boehmite treatment has a thickness of as small as up to about $1.0\mu$ and is insufficient in toughness and texture. Therefore, if the organic coating formed thereon should be marred for one cause or another, corrosion may possibly develop in the aluminum oxide coating from that portion.

Another process, so-called chemical conversion treatment, is also known in which aluminum or aluminum alloy is immersed in an aqueous solution of phosphate and/or chromate to form a chemical conversion layer thereon and an organic coating composition is thereafter applied onto the layer. However, this process also fails to assure good adhesion between the organic coating and the chemical conversion coating layer formed on aluminum or aluminum alloy. Moreover, the layer formed by chemical conversion is not satisfactory in its resistance to corrosion. Thus the process has drawbacks similar to those of the boehmite treatment described. Such drawbacks of these processes entail serious problems when aluminum or aluminum alloy is used for sash and external building materials.

An object of this invention is to provide a process for coating aluminum or aluminum alloy subjected to boehmite treatment or chemical conversion treatment with an organic coating composition with high adhesion.

Another object of this invention is to provide a coating process capable of forming a highly corrosion-resistant coating on aluminum or aluminum alloy which has been subjected to boehmite treatment or chemical conversion treatment.

Other objects of this invention will become apparent from the following description.

The foregoing objects of this invention can be fulfilled by a process comprising the steps of subjecting aluminum or aluminum alloy to boehmite treatment or chemical conversion treatment, conducting electrolysis using the resulting aluminum or aluminum alloy as an electrode in an aqueous solution of a water-soluble salt of at least one oxyacid selected from the group consisting of silicic acid, boric acid, phosphoric acid, vanadic acid, tungstic acid, permanganic acid, molybdic acid and stannic acid, and thereafter coating electrophoretically the aluminum or aluminum alloy with an aqueous organic coating composition containing at least one water-soluble salt mentioned above.

According to the research of the present inventors it has been revealed that when aluminum or aluminum alloy subjected to boehmite treatment or chemical conversion treatment is electrolytically anodized with an aqueous solution of water-soluble salt of the abovespecified oxyacid and then electrophoretically coated with an aqueous organic coating composition containing a water-soluble salt of the above-mentioned oxyacid, the resulting coated aluminum or aluminum alloy displays high order of corrosion resistance and hardness and excellent durability. It is to be noted that these properties are more excellent that when aluminum or aluminum alloy is coated in accordance with our copending application Ser. No. 484,985, filed July 1, 1974, in which aluminum or its alloy is electrolytically anodized with an aqueous solution of a water-soluble salt of the above-specified oxyacid and then electrophoretically coated with an aqueous organic coating composition not containing such water-soluble oxyacid salt. The reason why the aluminum or aluminum alloy treated in accordance with the present invention has such excellent properties has not been made clear yet, but it is supposedly attributable to the fact that in the electrolysis step of an aqueous solution of the water-soluble oxyacid salt, the oxyacid anions resulting from the dissociation of the oxyacid salt are adsorbed by the surface of aluminum or aluminum alloy, whereupon they release their charge and react with the boehmite layer or chemical conversion layer, thereby forming a new inorganic layer and that when the resulting aluminum or its alloy having the new layer is electrophoretically coated with an aqueous organic coating composition containing the water-soluble oxyacid salt, the oxyacid is adsorbed by the new layer first, then the oxyacid and the binder resin in mixture and the binder resin finally to produce a new complex coating layer having excellent compactness on the aluminum or its alloy with a high adhering strength.

Moreover, the research of the present inventors reveals that aqueous organic coating composition containing the water-soluble salt of the above-specified oxyacid is more excellent in storage stability as compared with conventional aqueous organic coating composition not containing such water-soluble oxyacid salt. In fact, according to the former coating composition a coating film free from seediness, cissing, indentation and like undesired changes can be obtained even after a prolonged period of storage.

In practicing the process of this invention, aluminum or aluminum alloy is first subjected to usual pretreatment including degreasing and etching. Degreasing is conducted in usual manner, for example, by immersing aluminum or aluminum alloy in an acid such as nitric or sulfuric acid at room temperature. Similarly, etching is conducted in usual manner as by immersing aluminum or aluminum alloy in an alkali solution at a temperature of about 20° to 80°C. The aluminum or aluminum alloy thus pretreated is then subjected to boehmite treatment or chemical conversion treatment which is carried out by a conventional method.

The boehmite treatment is uaually conducted by contacting the pretreated aluminum or aluminum alloy with hot water or steam containing or not containing ammonia or amines. Examples of the amines usable are monoethanolamine, diethanolamine, triethanolamine, dimethylethanolamine and like water-soluble amines. Generally, about 0.1 to 5 parts by weight of amine or ammonia is used per 100 parts by weight of water. Use of such amine or ammonia increases the thickness of aluminum oxide layer produced by the boehmite treatment, but it is impossible to obtain an aluminum oxide layer having a thickness of more than about 1.0 $\mu$. The aluminum or aluminum alloy is kept in contact with hot water or steam usually for about 5 to 60 minutes. The temperature of hot water to be used is usually in the range of 65°C to boiling point, preferably 80°C to boiling point and that of steam in the range of 100° to 180°C, preferably 130° to 150°C. Such contact is effected by methods heretofore employed, for example, by immersion or spraying.

Generally, the chemical conversion treatment is conducted in conventional manner. Examples of the chemical conversion treatment are MBV method using sodium carbonate and sodium chromate, EW method using sodium carbonate, sodium chromate and sodium silicate, LW method using sodium carbonate, sodium chromate and sodium primary phosphate, Pylumin method using sodium carbonate, sodium chromate and basic chromium carbonate, Alrock method using sodium carbonate and potassium dichromate, Jirocka method using dilute nitric acid containing heavy metal or using a mixture of permanganic acid and hydrofluoric acid containing heavy metal, Pacz method using a mixture of sodium silicofluoride and ammonium nitrate which contains a nickel or cobalt salt, a method using manganese dihydrogenphosphate and manganese silicofluoride, and a method wherein acidic zinc phosphate, phosphoric acid and chromic acid are used, etc.

The aluminum or aluminum alloy thus subjected to boehmite or chemical conversion treatment is rinsed with water and then used as an electrode to conduct electrolysis in an aqueous solution of water-soluble salt of at least one oxyacid selected from the group consisting of silicic acid, boric acid, phosphoric acid, molybdic acid, vanadic acid, permanganic acid, tungstic acid and stannic acid.

The oxyacid salts to be used include various water-soluble salts of the above oxyacids with monovalent to trivalent metals, ammonia or organic amines. The silicates include orthosilicates, meta-silicates and disilicates and like polysilicates. Examples thereof are sodium orthosilicate, potassium orthosilicate, lithium orthosilicate, sodium metasilicate, potassium metasilicate, lithium metasilicate, lithium pentasilicate, barium silicate, ammonium silicate, tetramethanol ammonium silicate, triethanol ammonium silicate, etc. The borates include metaborates, tetraborates, pentaborates, perborates, biborates, borate-hydrogen peroxide addition products and boroformates. Examples are lithium metaborate ($LiBO_2$), potassium metaborate ($KBO_2$), sodium metaborate ($NaBO_2$), ammonium metaborate, lithium tetraborate ($Li_2B_4O_7 \cdot 5H_2O$), potassium tetraborate, sodium tetraborate, ammonium tetraborate [$(NH_4)_2B_4O_7 \cdot 4H_2O$], calcium metaborate [$Ca(BO_2)_2 \cdot 2H_2O$], sodium pentaborate ($Na_2B_{10}O_{16} \cdot 10H_2O$), sodium perborate ($NaBO_2 \cdot H_2O_2 \cdot 3H_2O$), sodium borate-hydrogen peroxide addition product ($NaBO_2 \cdot H_2O_2$), sodium boroformate ($NaH_2BO_2 \cdot HCOOH \cdot 2H_2O$), ammonium biborate [$(NH_4)HB_4O_7 \cdot 3H_2O$], etc. 52 The phosphates include orthophosphates, pyrophosphates and polymetaphosphates. Examples are potassium monobasic phosphate ($KH_2PO_4$), sodium pyrophosphate ($Na_4P_2O_7$), sodium metaphosphate ($NaPO_3$), aluminum hydrophosphate [$Al(H_2PO_4)_3$], etc. The vanadates include orthovanadates, metavanadates and pyrovanadates. Examples are lithium orthovanadate ($Li_3VO_4$), sodium orthovanadate ($Na_3VO_4$), lithium metavanadate ($LiVO_3 \cdot 2H_2O$), .5 sodium metavanadate ($NaVO_3$), potassium metavanadate ($KVO_3$), ammonium metavanadate ($NH_4VO_3$) or [$(NH_4)_4V_4O_{12}$], sodium pyrovanadate ($Na_2V_2O_7$), etc. The tungstates include orthotungstates, metatungstates, paratungstates, pentatungstates and heptatungstates. Also employable are phosphorus wolframates, borotungstates and like complex salts. Examples are lithium tungstate ($Li_2WO_4$), sodium tungstate ($Na_2WO_4 \cdot 2H_2O$), potassium tungstate ($K_2WO_4$), barium tungstate ($BaWO_4$), calcium tungstate ($CaWO_4$), strontium tungstate ($SrWO_4$), sodium metatungstate ($Na_2W_4O_{13}$), potassium metatungstate ($K_2W_4O_{13} \cdot 8H_2O$), sodium paratungstate ($Na_6W_7O_{24}$), ammonium pentatungstate [$(NH_4)_4W_5O_{17} \cdot 5H_2O$], ammonium heptatungstate [$(NH_4)_6W_7O_{24} \cdot 6H_2O$], sodium phosphowolframate ($2Na_2O \cdot P_2O_5 \cdot 12WO_3 \cdot 18H_2O$), barium borotungstate ($2BaO \cdot B_2O_3 \cdot 9WO_3 \cdot 18H_2O$), etc. Examples of permanganates are lithium permanganate ($LiMnO_4$), sodium permanganate ($NaMnO_4 \cdot 3H_2O$), potassium permanganate ($KMnO_4$), ammonium permanganate [$(NH_4)MnO_4$], calcium permanganate [$Ca(MnO_4)_2 \cdot 4H_2O$], barium permanganate [$Ba(MnO_4)_2$], magnesium permanganate [$Mg(MnO_4)_2 \cdot 6H_2O$], strontium permanganate [$Sr(MnO_4)_2 \cdot 3H_2O$], etc. The stannates include orthostannates and metastannates. Examples are potassium orthostannate ($K_2SnO_3 \cdot 3H_2O$), lithium orthostannate ($Li_2SnO_3 \cdot 3H_2O$), sodium orthostannate ($Na_2SnO_3 \cdot 3H_2O$), magnesium stannate, calcium stannate, lead stannate, ammonium stannate, potassium metastannate ($K_2O \cdot 5SnO_2 \cdot 4H_2O$), sodium metastannate ($Na_2O \cdot 5SnO_2 \cdot 8H_2O$), etc. Examples of molybdates are orthomolybdates and metamolybdates. More specific examples are lithium molybdate ($Li_2MoO_4$), sodium molybdate ($Na_2MoO_4$), potassium molybdate ($K_2MoO_4$), ammonium molybdate [$(NH_4)_6Mo_7O_{24} \cdot 4H_2O$], triethylamine molybdate, etc.

Preferable among these oxyacid salts are those of alkali metals which generally have high water solubilities. Among the oxyacid salts enumerated above, silicates are preferable to use because they are economical and readily available. According to this invention these oxyacid salts are used singly or in admixture with one another.

The concentration of such oxyacid salt in its aqueous solution is usually about 0.1% by weight to saturation, preferably about 1.0% by weight to saturation, although variable with the kind of the oxyacid salt.

In the present invention, water-soluble salts of chromic acid can be used together with the abovementioned oxyacid salts, whereby the anti-corrosive property of the resulting coating is further improved. Examples of the chromates are lithium chromate ($Li_2CrO_4 \cdot 2H_2O$), sodium chromate ($Na_2CrO_4 \cdot 10H_2O$), potassium chromate ($K_2CrO_4$), ammonium chromate [$(NH_4)_2CrO_4$], calcium chromate ($CaCrO_4 \cdot 2H_2O$) and strontium chromate ($SrCrO_4$).

According to this invention, the electrolysis is conducted in a conventional manner. For example, the aluminum or aluminum alloy and another electroconductive material used as electrodes are immersed in aqueous solution of the above-specified oxyacid salt, and electric current is applied between the electrodes.

The electric current may be either direct current or alternating current. When direct current is used, the aluminum or aluminum alloy is to be the anode and when alternating current is used, the aluminum or aluminum alloy can be used either as anode or as cathode. The advantageous range of the electric voltage is from 5 to 300 volts for direct current, or from 5 to 200 volts for alternating current. The electric current is applied for more than 5 seconds. The temperature of the electrolytic solution is usually in the range between the solidifying point of the solution of the oxyacid salt and boiling point of the solution, preferably in the range of 20° to 60°C.

According to this invention, the electrolytic operation can be conducted repeatedly twice or more times with an aqueous solution of the same oxyacid salt or with aqueous solution of different oxyacid salts. For example, electrolysis is conducted with an aqueous solution of silicate and then with the same aqueous solution of silicate, or first with an aqueous solution of silicate and subsequently with an aqueous solution of another oxyacid salt. When repeatedly carried out, the electrolysis also gives the resulting aluminum or aluminum alloy higher corrosion resistance than when it is conducted only once. Moreover, the electrolysis causes some water to undergo electrolysis to give off hydrogen gas in the form of bubbles. Consequently, the bubbling lowers the efficiency of the electrolytic operation. However, if the electrolysis is conducted repeatedly, the evolution of hydrogen gas is noticeably reduced as compared with the case wherein the electrolytic operation is conducted only once, assuring improved efficiency.

After the electrolysis, the aluminum or aluminum alloy is rinsed with water and dried, whereby a thick layer of higher hardness and finer texture is formed. According to this invention, the dried product may further be heated at a temperature of about 150° to 250°C when desired to thereby increase the hardness of the coating.

The aluminum of aluminum alloy is thereafter electrophoretically coated with an aqueous organic coating composition containing a water-soluble salt of at least one oxyacid selected from the group consisting of silicic acid, boric acid, phosphoric acid, permanganic acid, vanadic acid, tungstic acid, molybdic acid, and stannic acid. The aqueous organic coating composition is prepared by adding the water-soluble salt to one of various aqueous electrophoretic coating compositions conventionally known. These known compositions generally comprise an aqueous medium and a water-soluble or water-dispersible binder resin dissolved or dispersed in the aqueous medium. The water-soluble salts to be added to the known aqueous electrophoretic coating compositions are various water-soluble salts of the specified oxyacids usable for the foregoing electrolytic operation.

Although somewhat variable with the kind of the oxyacid salt used, the amount of the salt to be used is usually about 0.001 to 10.0 parts by weight, preferably about 0.05 to 5.0 parts by weight, per 100 parts of the binder resin.

If necessary, pigments, extender pigments and like suitable additives can be added to the composition. Usable as the binder resin is any of these conventionally known which are typically synthetic polycarboxylic acid resins. Examples of the polycarboxylic acid resins are addition products of drying oils and $\alpha,\beta$-ethylenically unsaturated dibasic acids such as maleic acid, epoxy resin esterified with fatty acid and having carboxyl groups, alkyd resin having carboxyl groups, copolymer of vinyl monomer and acrylic or methacrylic acid, polyester having carboxyl groups, a reaction product of polybutadiene and $\alpha,\beta$-ethylenically unsaturated dibasic acid such as maleic acid, etc. The binder resin concentration of the coating composition is in the range of 1 to 20 weight percent, preferably 5 to 15 weight percent. Usable pigments are coloring pigments such as titanium oxide, red iron oxide, Phthalocyanine Blue, carbon black and the like and extender pigments such as talc, baryta, calcium carbonate, Asbestine and clay. Usually, such pigment is used in an amount of about 1 to 30 parts by weight per 100 parts by weight of the binder resin. The liquid medium is usually water or a mixture of water and an organic solvent. The solvent to be used is miscible with water and can dissolve the binder resin therein. The amount of the organic solvent to be used is usually less than 10 weight percent based on water. Examples of the solvent are methylcyclohexanol, benzyl alcohol, n-butanol, butyl cellosolve, isopropyl cellosolve, methyl cellosolve, isopropanol, carbitol, ethanol, etc. The other additives are conventionally known plasticizer, drying agent, dispersing agent, emulsifier, wetting agent, defoaming agent and the like.

The electrophoretic coating operation is conducted in conventional manner. For example, the aluminum or aluminum alloy substrate to be coated is immersed into the electrophoretic coating composition in the bath and connected to the positive pole of a direct current. Another electroconductive material is immersed in the composition in the same bath and connected to the negative electrode and then direct current is applied between them. The voltage of said direct current is usually in the range of 30 to 400 volts.

The temperature of the composition in the bath can vary from the solidifying point of the composition to the boiling point of the composition, but a temperature between 15° and 40°C is preferable.

It is desirable to apply the electric current for 30 seconds to 10 minutes for the process. The electrophoretic coating thus prepared is heated at a temperature of 140° to 250°C for baking, whereby a uniform hardened coating is obtained.

The process of this invention is applicable to various aluminum alloys such as Al—Si, Al—Mg, Al—Mn, Al—Si—Mg, and like alloys. The aluminum or aluminum alloy to be treated by the present process is not limited to plate or panel but may be of various shapes.

The process of this invention will be described below in greater detail with reference to examples and comparison examples, in which the percentages and parts are all by weight unless otherwise specified. In the examples aluminum panels serving as substrates are prepared by the method stated below, and electrolytic operation and electrophoretic coating operation are conducted according to the procedures stated below.

PREPARATION OF SUBSTRATE

A substrate is prepared by degreasing and etching an aluminum alloy panel measuring 70 mm in width, 150 mm in length and 2 mm in thickness (consisting of 98.0% aluminum, 0.45% Si, 0.55% Mg and 1% others; JIS H 4100) according to the following procedure:

a. Immersion in 10% aqueous solution of nitric acid at room temperature for 5 minutes.

b. Rinsing with water.
c. Immersion in 5% aqueous solution of caustic soda at 50°C for 5 minutes.
d. Rinsing with water.
e. Immersion in 10% aqueous solution of nitric acid at room temperature for 1 minute.
f. Rinsing with water.

ELECTROLYTIC OPERATION

Into a plastic container measuring 10 cm in width, 20 cm in length and 15 cm in depth is placed 2000 cc of a solution of an oxyacid salt. When direct current is applied, the aluminum substrate serving as the anode and a mild steel plate serving as cathode are immersed in the solution as spaced apart from each other by 15 cm. When alternating current is applied, the aluminum substrates as electrodes are immersed in the same manner as above. Electrolytic operation is conducted at a liquid temperature of 25°C by applying a specified voltage. The aluminum substrate is thereafter washed with water and then dried.

ELECTROPHORETIC COATING OPERATION

Into the same container as used in the abovementioned electrolytic operation is placed 2000 cc of electrophoretic coating composition and the aluminum substrate serving as an anode and a mild steel plate as a cathode are immersed in the electrophoretic coating composition as spaced apart from each other by 15 cm. Electrophoretic coating operation is conducted at a liquid temperature of 25°C by applying direct current of a specified voltage. The aluminum substrate is thereafter washed with water and then dried.

The properties of the aluminum substrate obtained in Examples and Comparison Examples are determined by the following method.

1. Coating thickness
   Measured by a high-frequency thickness gauge.
2. Hardness
   Leave a test panel to stand in a constant temperature and constant humidity chamber at a temperature of 20° ± 1°C and a humidity of 75% for 1 hour. Fully sharpen a pencil (trade mark "UNI", product of Mitsubishi Pencil Co., Ltd., Japan) by a pencil sharpener and then wear away the sharp pencil point to flatness. Firmly press the pencil against the coating surface of the test panel at an angle of 45° between the axis of the pencil .nd the coating surface and push the pencil forward at a constant speed of 3 cm/sec to positioned in this state. Repeat the same procedure 5 times with each of pencils having various hardness. The hardness of the coating is expressed in terms of the highest of the hardnesses of the pencils with which the coating remains unbroken at more than 4 strokes.
3. Cross-cut Erichsen test
   After leaving a test panel to stand in a constant temperature and constant humidity chamber at a temperature of 20° ± 1°C and a humidity of 75% for 1 hour, make eleven parallel cuts, 1 mm apart, in the coating film up to the surface of aluminum alloy substrate, using a single-edged razor blade. Make a similar set of cuts at right angles to the first cut to form 100 squares. Using an Erichsen film tester, push out the test panel 5 mm and apply a piece of cellophane adhesive tape to the pushed-out portion. Press the tape firmly from above and thereafter remove the tape rapidly. The evaluation is expressed by a fraction in which the denominator is the number of squares formed and the numerator is the number of squares left unremoved. Thus 100/100 indicates that the coating remains completely unremoved.
4. Impact resistance
   After leaving a test panel to stand in a constant temperature and constant humidity chamber at a temperature of 20° ± 1°C and a humidity of 75% for 1 hour, test the panel on a Du Pont impact tester (1-kg, ½ inch). Determine the largest height (cm) of the weight entailing no cracking in the coating.
5. Resistance to boiling water
   Place deionized water into a beaker along with a boiling stone and heat to boiling. Boil a test panel for 5 hours in the water while keeping the panel spaced apart from the bottom of the beaker by 20 mm. Take out the test panel to check for any change in the coating such as discoloring, peeling, cracking or blistering with the unaided eye. Furthermore after leaving the test panel to stand for 1 hour, conduct cross-cut Erichsen test in the same manner as above to evaluate the adhering ability.
6. Resistance to sulfurous acid
   Into a glass container, place a 6% aqueous solution of sulfurous acid having a specific gravity of 1.03 and add deionized water to prepare a 1% aqueous solution of sulfurous acid. Immerse a test panel in the solution at 20°C for 72 hours and then take it out to check for any change in the coating such as discoloring, peeling, cracking and blistering with the unaided eye. In the same manner as above, conduct cross-cut Erichsen test to evaluate the adhering ability.
7. Resistance to alkali solution
   Fill a glass container with a 5% aqueous solution of sodium hydroxide and immerse a test panel therein at 20°C for 120 hours. Then take out the test panel and inspect the surface with the unaided eye to check for any change in the coating such as peeling, pitting and blistering.
8. CASS test (Copper-Accelerated Acetic Acid salt Spray Testing)
   Conduct CASS test according to JIS H 8601 for 120 hours. Inspect the appearance of coating with the unaided eye.
9. Stability of the coating composition
   PLace about 4 liters of a coating composition in a stainless steel container measuring 18 cm in diameter and 25 cm in depth and equipped with a stirrer. Continuously stir the composition at about 200 r.p.m. while maintaining the composition at 30°C. Conduct electrophoretic coating test using the composition every week. Determine the longest period of stirring of the composition which produces a coating free of changes such as seediness, cissing and indentation.

EXAMPLE 1

To 140 parts of water-soluble acrylic resin (trade mark: "ARON 4002", product of Toa Gosei Chemical Industry Co., Ltd. Japan, containing 50% solid) are added 30 parts of water-soluble melamine resin (trade mark: "XM-1116", product of American Cyanamid Company, U.S.A., 100% solid), 0.3 part of potassium orthomolybdate and 900 parts of deionized water, and the mixture is uniformly mixed together to obtain an aqueous coating composition. The pH of the composition is adjusted to 8 by adding triethylamine to the solution.

An aluminum substrate prepared as described above is immersed in boiling deionized water for 10 minutes for boehmite treatment, then rinsed with water and subsequently immersed in 10 wt.% aqueous solution of sodium silicate ($Na_2O.2SiO_2$) to conduct electrolysis by using direct current at 80 volts for 60 seconds. The aluminum substrate is then electrophoretically coated with the above coating composition at voltage of 100 volts to obtain a coated panel. Various properties of the coated panel obtained are given in Table 1 below.

EXAMPLES 2 to 4

Aluminum substrates are treated in the same manner as in Example 1 except that electrolysis is conducted using specified current at the voltages and for periods of time listed in Table 1. The acid resistance of each of the aluminum substrates thus treated is measured with the result shown in Table 1.

COMPARISON EXAMPLE 1

Aluminum substrate is treated in the same manner as in Example 1 except that the aqueous coating composition not containing potassium orthomolybdate is used in place of the aqueous coating composition containing potassium orthomolybdate.

COMPARISON EXAMPLE 2

Aluminum substrate is treated in the same manner as Example 1 except that electrolysis is not conducted.

COMPARISON EXAMPLES 3 and 4

Aluminum substrates prepared as above were immersed in 10 wt.% aqueous solution of sodium silicate ($Na_2O.2SiO_2$) without conducting boehmite treatment, and electrolysis was carried out under the conditions listed in Table 1, followed by electrophoretic coating operation in the same manner as in Example 1.

Table 1

|  | Ex. 1 | Ex. 2 | Ex. 3 | Ex. 4 | Comp. Ex. 1 | Comp. Ex. 2 | Comp. Ex. 3 | Comp. Ex. 4 |
| --- | --- | --- | --- | --- | --- | --- | --- | --- |
| Electrolysis conditions |  |  |  |  |  |  |  |  |
| Current | D.C. | D.C. | A.C. | A.C. | D.C. | — | D.C. | A.C. |
| Voltage (V) | 80 | 80 | 50 | 50 | 80 | — | 80 | 40 |
| Time (sec) | 60 | 300 | 60 | 300 | 60 | — | 60 | 60 |
| Coating thickness ($\mu$) | 16 | 15 | 17 | 15 | 16 | 17 | 17 | 17 |
| Hardness | 4H | 4H | 4H | 4H | 3H | 4H | 4H | 4H |
| Cross-cut test | 100/100 | 100/100 | 100/100 | 100/100 | 100/100 | 90/100 | 100/100 | 100/100 |
| Impact resistance (cm) | 50 | 50 | 50 | 50 | 50 | 30 | 50 | 50 |
| Resistance to boiling water |  |  |  |  |  |  |  |  |
| Appearance | Good | Good | Good | Good | Good | Good | Partial peeling | Partial peeling |
| Adhering ability | 100/100 | 100/100 | 100/100 | 100/100 | 100/100 | 45/100 | — | — |
| Hardness | 4H | 4H | 4H | 4H | H | — | — | — |
| Resistance to sulfurous acid |  |  |  |  |  |  |  |  |
| Appearance | Good | Good | Good | Good | Good | Good | Blistering | Blistering |
| Adhering ability | 100/100 | 100/100 | 100/100 | 100/100 | 100/100 | 55/100 | 10/100 | 10/100 |
| Resistance to alkali solution | Good | Good | Good | Good | Partial peeling | Good | Peeling | Peeling |
| CASS Test (Rating No.) | 10 | 10 | 10 | 10 | 9 | 9.5 | 8 | 8.5 |
| Stability of coating composition (week) | 5 | 5 | 5 | 5 | 2 | 5 | 5 | 5 |

EXAMPLES 5 to 7

Aluminum substrates are treated in the same manner as in Example 1 except that the specified amounts of specified salts of oxyacids listed in Table 2 are used respectively in place of 0.3 part of potassium molybdate contained in the electrophoretic coating bath. The properties of the substrates thus treated are determined with the results shown in Table 2.

Table 2

|  | Ex. 5 | Ex. 6 | Ex. 7 |
| --- | --- | --- | --- |
| Salt of oxyacid used in electrophoretic coating bath | $K_2O.5SnO_2.4H_2O$ | $Na_2WO_4.2H_2O$ | $KVO_3$ |
| Amount of salt (parts by weight per 100 parts of binder resin) | 1.0 | 0.5 | 0.5 |
| Coating thickness ($\mu$) | 18 | 19 | 18 |
| Hardness | 4H | 4H | 4H |
| Cross-cut test | 100/100 | 100/100 | 100/100 |
| Resistance to boiling water | Good | Good | Good |
| Resistance to sulfurous acid | Good | Good | Good |
| Resistance to alkali CASS test | Good | Good | Good |

Table 2-continued

|  | Ex. 5 | Ex. 6 | Ex. 7 |
|---|---|---|---|
| (Rating number) | 10 | 10 | 10 |

EXAMPLE 8

To 100 parts of unneutralized polyester resin solution (trade mark: "Epoky-SNED-5", product of Mitsui-Toatsu Co., Ltd., Japan, containing 70% resin solid) is added 30 parts of water-soluble melamine resin ("XM-1116," product of American Cyanamid Company, U.S.A., 100% resin solid), and the two ingredients are mixed together. To the mixture are added 8 parts of dimethylaminoethanol and 862 parts of deionized water, followed by thorough mixing to prepare a uniform aqueous dispersion, which contains 10.0% of resin solid and has a pH of 8.3. To 1000 parts of the dispersion is added 10 parts of 10% aqueous solution of sodium silicate ($Na_2O.2SiO_2$) to prepare an electrophoretic coating composition.

A bath for chemical conversion is prepared by adding 60 parts of phosphoric acid, 4 parts of sodium fluoride and 13 parts of chromic anhydride to 1,000 parts of deionized water. An aluminum substrate is immersed in the bath at room temperature for 10 minutes and then washed with water. Subsequently the substrate is subjected to electrolysis in 5% aqueous solution of potassium orthomolybdate at 65 volts for 60 seconds and then washed with water.

The substrate is then subjected to electrophoresis for 2 minutes in the electrophoretic coating composition prepared above at 140 volts. The electrophoretically coated substrate is thereafter washed with water and baked with hot air at 180°C for 30 minutes. The properties of the coating obtained are listed in Table 3.

EXAMPLES 9 and 10

Electrophoretic coating compositions are prepared in the same manner as in Example 8 except that sodium tetraborate and ammonium metavanadate are used respectively in place of sodium silicate used in the electrophoretic coating composition of Example 8. Aluminum substrates are treated in the same manner as in Example 8 except that these electrophoretic coating compositions are used respectively. The properties of the substrates thus obtained are listed in Table 3 below.

Table 3

|  | Ex. 8 | Ex. 9 | Ex. 10 |
|---|---|---|---|
| Salt of oxyacid used in electrophoretic coating bath | $Na_2O.2SiO_2$ | $Na_2B_4O_7$ | $NH_4VO_3$ |
| Amount of salt (parts) by weight per 100 parts of binder resin) | 1.0 | 0.5 | 0.5 |
| Coating thickness($\mu$) | 17 | 18 | 18 |
| Hardness | 4H | 4H | 4H |
| Cross-cut test | 100/100 | 100/100 | 100/100 |
| Resistance to boiling water | Good | Good | Good |
| Resistance to sulfurous acid | Good | Good | Good |
| Resistance to alkali | Good | Good | Good |
| CASS test (Rating number) | 10 | 9.5 | 9.5 |
| Stability of coating composition | Good | Good | Good |

EXAMPLES 11 to 18

Aluminum substrates are treated in the same manner as in Example 1 except that the specified salts of oxyacids listed in Table 4 below are used respectively in place of sodium silicate used in the electrolytic bath of Example 1. The coating films obtained have substantially the same properties as one obtained in Example 1.

Table 4

| Example No. | Salt of oxyacid used in electrolytic bath |
|---|---|
| 11 | Potassium tetraborate |
| 12 | Sodium hexametaphosphate |
| 13 | A mixture of sodium silicate and potassium chromate (mixture ratio is 1 : 1 by weight) |
| 14 | Potassium paramolybdate |
| 15 | Sodium metavanadate |
| 16 | Potassium permanganate |
| 17 | Sodium tungstate |
| 18 | Sodium metastannate |

EXAMPLES 19 to 24

Aluminum substrates are treated in the same manner as in Example 8 except that the specified salts of oxyacids listed in Table 5 below are used respectively in place of potassium orthomolybdate used in the electrolytic bath of Example 8. The coating films obtained have substantially the same properties as one obtained in Example 8.

Table 5

| Example No. | Salt of oxyacid used in electrolytic bath |
|---|---|
| 19 | Potassium silicate |
| 20 | Potassium hexametaphosphate |
| 21 | Sodium borate-hydrogen peroxide addition product |
| 22 | Potassium metavanadate |
| 23 | Ammonium permanganate |
| 24 | Potassium tungstate |

EXAMPLES 25 to 28

Aluminum substrates are treated in the same manner as in Example 1 except that the specified salts of oxyacids listed in Table 6 below are used respectively in place of potassium orthomolybdate used in the electrophoretic bath of Example 1. The coating films obtained have substantially the same properties as one obtained in Example 1.

Table 6

| Example No. | Salt of oxyacid used in electrophoretic bath |
|---|---|
| 25 | Potassium permanganate |
| 26 | Sodium borate |
| 27 | Sodium hexametaphosphate |
| 28 | Lithium metavanadate |

EXAMPLES 29 to 33

Aluminum substrates are treated in the same manner as in Example 8 except that the specified salts of oxyacids listed in Table 7 below are used respectively in place of sodium silicate used in the electrophoretic bath of Example 8. The coatings obtained have substantially the same properties as one obtained in Example 8.

Table 7

| Example No. | Salt of oxyacid used in electrophoretic bath |
|---|---|
| 29 | Potassium hexametaphosphate |
| 30 | A mixture of sodium tungstate and ammonium chormate (mixture ratio is 1 : 1 by weight) |
| 31 | Sodium molybdate |
| 32 | Potassium permanganate |
| 33 | Sodium tungstate |

What we claim is:

1. A process for coating an aluminum or aluminum alloy comprising the steps of subjecting aluminum or aluminum alloy to boehmite treatment or chemical conversion treatment, conducting electrolysis using the resulting aluminum or aluminum alloy as an electrode in an aqueous solution of a water-soluble salt of at least one oxyacid, and thereafter coating electrophoretically the aluminum or aluminum alloy with an aqueous organic coating composition containing a binder resin and a water-soluble salt of at least one oxyacid to form a resin layer, said oxyacid contained in the aqueous solution and aqueous organic coating composition being at least one oxyacid selected from the group consisting of silicic acid, boric acid, phosphoric acid, molybdic acid, vanadic acid, permanganic acid, stannic acid and tungstic acid.

2. The process for coating an aluminum or aluminum alloy according to claim 1, in which said aluminum or aluminum alloy is subjected to boehmite treatment.

3. The process for coating an aluminum or aluminum alloy according to claim 1, in which said aluminum or aluminum alloy is subjected to chemical conversion treatment.

4. The process for coating an aluminum or aluminum alloy according to claim 1, in which said aqueous solution of the water-soluble salt of at least one oxyacid has a concentration ranging from 0.1 weight percent to saturation.

5. The process for coating an aluminum or aluminum alloy according to claim 4, in which said concentration is in the range of 1.0 weight percent to saturation.

6. The process for coating an aluminum or aluminum alloy according to claim 1, in which said aqueous organic coating composition contains the water-soluble salt of at least one oxyacid in an amount of 0.001 to 10.0 weight percent based on the binder resin.

7. The process for coating an aluminum or aluminum alloy according to claim 6, in which said aqueous organic coating composition contains the water-soluble salt of at least one oxyacid in an amount of 0.05 to 5 weight percent based on the binder resin.

8. The process for coating an aluminum or aluminum alloy according to claim 1, in which said aqueous solution of the water-soluble salt is an aqueous solution of at least one water-soluble salt of silicic acid.

9. The process for coating an aluminum or aluminum alloy according to claim 1, in which said aqueous solution of the water-soluble salt is an aqueous solution of at least one water-soluble salt of boric acid.

10. The process for coating an aluminum or aluminum alloy according to claim 1, in which said aqueous solution of the water-soluble salt is an aqueous solution of at least one water-soluble salt of tungstic acid.

11. The process for coating an aluminum or aluminum alloy according to claim 1, in which said aqueous solution of the water-soluble salt is an aqueous solution of at least one water-soluble salt of phosphoric acid.

12. The process for coating an aluminum or aluminum alloy according to claim 1, in which said aqueous solution of the water-soluble salt is an aqueous solution of at least one water-soluble salt of molybdic acid.

13. The process for coating an aluminum or aluminum alloy according to claim 1, in which said aqueous solution of the water-soluble salt is an aqueous solution of at least one water-soluble salt of vanadic acid.

14. The process for coating an aluminum or aluminum alloy according to claim 1, in which said aqueous solution of the water-soluble salt is an aqueous solution of at least one water-soluble salt of permanganic acid.

15. The process for coating an aluminum or aluminum alloy according to claim 1, in which said aqueous solution of the water-soluble salt is an aqueous solution of at least one water-soluble salt of stannic acid.

16. The process for coating an aluminum or aluminum alloy according to claim 1, in which said aqueous organic coating composition contains at least one water-soluble salt of silicic acid.

17. The process for coating an aluminum or aluminum alloy according to claim 1, in which said aqueous organic coating composition contains at least one water-soluble salt of boric acid.

18. The process for coating an aluminum or aluminum alloy according to claim 1, in which said aqueous organic coating composition contains at least one water-soluble salt of phosphoric acid.

19. The process for coating an aluminum or aluminum alloy according to claim 1, in which said aqueous organic coating composition contains at least one water-soluble salt of molybdic acid.

20. The process for coating an aluminum or aluminum alloy according to claim 1, in which said aqueous organic coating composition contains at least one water-soluble salt of vanadic acid.

21. The process for coating an aluminum or aluminum alloy according to claim 1, in which said aqueous organic coating composition contains at least one water-soluble salt of permanganic acid.

22. The process for coating an aluminum or aluminum alloy according to claim 1, in which said aqueous organic coating composition contains at least one water-soluble salt of stannic acid.

23. The process for coating an aluminum or aluminum alloy according to claim 1, in which said aqueous organic coating composition contains at least one water-soluble salt of tungstic acid.

24. The process for coating an aluminum or aluminum alloy according to claim 1, in which said binder resin is a polycarboxylic acid resin.

25. An aluminum or aluminum alloy coated by the method claimed in claim 1.

* * * * *